July 26, 1932.   B. BRUHN   1,869,237
METHOD OF PRODUCING A LINING FOR A ROTARY FURNACE
Filed Aug. 3, 1927   2 Sheets-Sheet 2

Patented July 26, 1932

1,869,237

UNITED STATES PATENT OFFICE

BRUNO BRUHN, OF BETHLEHEM, PENNSYLVANIA, ASSIGNOR TO THE FIRM OF G. POLYSIUS, AKTIENGESELLSCHAFT, OF DESSAU, GERMANY

METHOD OF PRODUCING A LINING FOR A ROTARY FURNACE

Application filed August 3, 1927, Serial No. 210,431, and in Germany March 28, 1925.

This invention relates to a method of producing a lining for a rotary furnace and consists essentially therein that a lining of aluminous cement is produced within said furnace during the operation of the same. According to my invention a further preliminary or auxiliary lining may be provided within the furnace, said lining serving as a support upon which said latter lining of aluminous cement may be formed during the operation of the furnace.

Considerable difficulty has been encountered heretofore in the forming of special linings on the inner walls of kilns adapted for the production of aluminous cement which will remain during normal operation of the kiln. As a matter of fact, until the present time with any special linings and to form a lining of the aluminous cement on the inner wall of the kiln which remains during operation of the furnace no practical process has been devised for making such cements in a rotary furnace. The difficulties which arise in attempting to make such cements in the aforementioned manner are of various nature; partly, these difficulties are due to the specific properties of the aluminous cement and partly to the construction of the rotary furnaces which at present are used in the cement industry. The problem of providing a proper lining which is fully suitable for the present purpose has not been successfully solved up to the present day.

It has, for instance, been proposed to provide a lining for furnaces consisting of an especial kind of cement-concrete which is obtained by mixing cement-clinkers with cement powder in a certain ratio and adding a proper quantity of water. A lining of this kind, however, has been found to be of no practical value for the manufacture of aluminous cement.

My present invention now is designed to do away with the aforementioned difficulties. By careful experiments and further considerations derived therefrom I have found, that in the manufacture of aluminous cement it is not suitable to provide a lining of the ordinary kind for the rotary furnace, such as for instance, a lining consisting of one of the known kinds of refractory material or of a concrete as above indicated. As a result of my experiments I have found that for the present purpose it is desirable to do away with any special linings and to cause the aluminous cement to deposit upon a lining of its own formed from parts of said aluminous cement which remain during operation of the furnace upon the water-cooled walls thereof.

The process according to my invention may, for instance, be carried out in such a manner that the required lining of aluminous cement may easily be produced within the furnace merely by properly conducting the heating gases through the furnace. According to my invention said lining of aluminous cement may also be produced by providing said furnace either wholly or partly with a provisional or auxiliary lining of the known kinds, and causing said lining of aluminous cement to deposit on said provisional or auxiliary lining during the process of melting and to be maintained in a sufficient thickness during operation of the furnace. In addition to this, according to my invention, the furnace may also be provided wholly or partly with a provisional or auxiliary lining consisting of an aluminous cement on which a further lining of aluminous cement may deposit during operation of the furnace.

It is apparent that the advantages of my present process are quite considerable. According to my invention the product which is obtained from the furnace will not come in contact with any lining of a different substance, such as is the case with ordinarily employed linings. In consequence thereof any reaction of the lining upon the product will be made impossible and the product obtained by the furnace will therefore be of uniform quality throughout. In addition to this, the lining of aluminous cement will practically have an unlimited lifetime, and the expenses connected with the renewal of refractory linings as well as the periods of standstill of the furnace resulting therefrom are entirely dispensed with according to my invention.

According to my invention furthermore, the process is carried out in such a manner that those places of the furnace are cooled by water which are passed by the aluminous cement while molten; preferably around the walls of the rotary furnace there is provided a cooling jacket similar to the jackets which are ordinary used in connection with certain other apparatus, such as for instance gas-generators. The cooling water is automatically supplied to and discharged from said jacket and the quantities of heat which are gained by the cooling process may be utilized in any of the well known ways.

In the accompanying drawings I have shown a furnace for carrying out the method of producing a lining for a rotary furnace according to my invention, Fig. 1 being a diagrammatic longitudinal section through one form of the rotary furnace in which the lining of aluminous cement is deposited directly on the walls of the furnace, and Fig. 2 representing in a similar way a modification of the rotary furnace in which a special provisional or auxiliary lining is used on which the lining of aluminous cement may deposit during operation of the furnace.

In all figures of the drawings the same reference characters are used for the same device.

Figure 1:
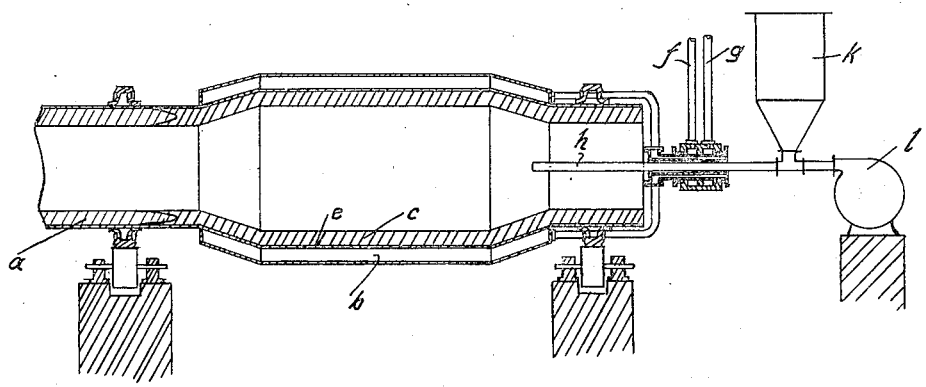

According to Fig. 1 the rotary furnace $a$ is provided with a cooling jacket $b$ in its hottest zone, for instance, in the zone of sintering. During operation of the furnace a molten layer $c$ will be deposited upon the iron wall $e$ of the furnace. The cooling liquid is conveyed to the cooling jacket $b$ by means of a conduit $f$ and discharged from said jacket by means of the conduit $g$. The nozzle serving for the introduction of the fuel is indicated at $h$, the fuel container at $k$ and the blower at $l$.

Figure 2:
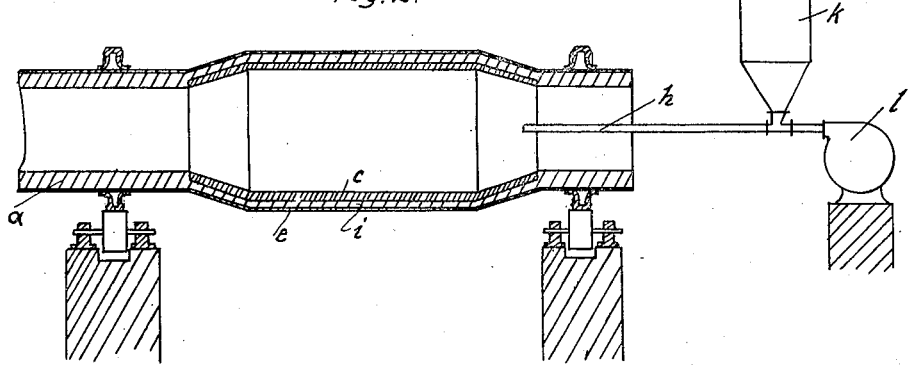
Figure 3:
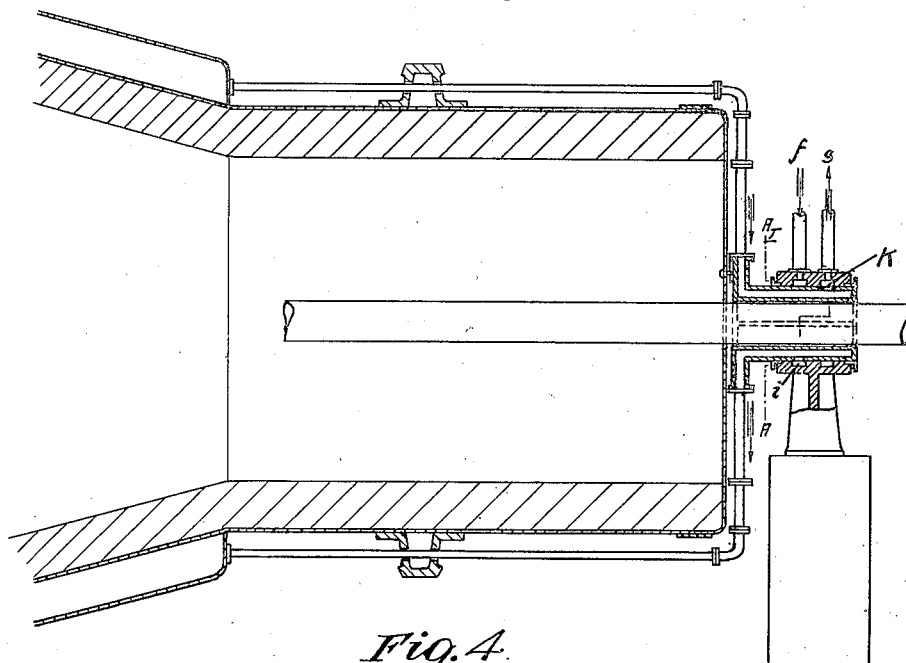
Fig. 3 is an enlarged detail view showing a water circulating system used according to my invention in connection with a rotary furnace.
Figure 4:
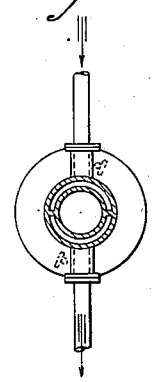
Fig. 4 is a transverse section taken on line A—A of Fig. 3.

The modified form of furnace which is represented in Fig. 2 of the drawings differs from the construction of the furnace according to Fig. 1 therein, that a preliminary or auxiliary lining $i$ is provided within the hottest zone, a further lining of aluminous cement in the form of a molten layer $c$ being deposited upon said lining $i$ during operation of the furnace. The processes which may be carried out with the furnace according to Fig. 1 and the furnace according to Fig. 2 differ therefore from each other by the fact, that according to Fig. 1 the lining of aluminous cement is immediately deposited upon the iron wall of the furnace, while according to Fig. 2 the lining of aluminous cement is deposited upon a preliminary or auxiliary lining which may be similar to the refractory lining of the ordinary kind.

I claim:

1. The method of producing a lining for the melting zone of a metallic rotary kiln consisting in operating the kiln with its normal charge of ingredients, reducing said ingredients to a molten state so that they flow over the unlined inner surface of the kiln within said zone, and applying cooling fluid to said zone from the exterior thereof to cause said molten material to harden and adhere to the inner surface to form a lining therefor of the same chemical characteristics as the material treated in the kiln.

2. The method of producing a lining for a rotary kiln used for burning aluminous cement consisting in rotating the kiln, introducing a quantity of the ingredients as normally burned in the kiln, heating the ingredients to reduce them to a molten state so that they flow over the inner surface of the kiln, and applying cooling fluid to the exterior of the kiln to cause the molten material to harden and adhere to the inner surface to form a lining therefor.

3. The method of producing a lining for a rotary kiln used for burning aluminous cement consisting in rotating the kiln, introducing a quantity of the ingredients as normally burned in the kiln, heating the ingredients to reduce them to a molten state so that they flow over the inner surface of the kiln, applying cooling fluid to the exterior of the kiln to cause the molten material to harden and adhere to the inner surface to form a lining therefor, and thereafter immediately operating the kiln in its normal manner and with the same ingredients to maintain said lining.

In testimony whereof I affix my signature.

BRUNO BRUHN.